United States Patent [19]
Geiner et al.

[11] Patent Number: 5,487,168
[45] Date of Patent: Jan. 23, 1996

[54] METHOD AND SYSTEM FOR GLOBAL OPTIMIZATION OF DEVICE ALLOCATION

[75] Inventors: Robert V. Geiner, Poughkeepsie; David L. Jensen, Peekskill, both of N.Y.

[73] Assignee: International Business Machines Corporation, Armonk, N.Y.

[21] Appl. No.: 359,943

[22] Filed: Dec. 20, 1994

Related U.S. Application Data

[63] Continuation of Ser. No. 898,619, Jun. 15, 1992, abandoned.

[51] Int. Cl.⁶ ............................................. G06F 13/18
[52] U.S. Cl. ................................. 395/650; 364/402
[58] Field of Search ............................. 364/401, 402, 364/468; 395/650

[56] References Cited

U.S. PATENT DOCUMENTS

| | | | |
|---|---|---|---|
| 4,355,705 | 10/1982 | Schröder et al. | 187/29 R |
| 4,411,337 | 10/1983 | Schröder et al. | 187/29 R |
| 4,495,570 | 1/1985 | Kitajima et al. | 364/200 |
| 4,727,487 | 2/1988 | Masui et al. | 364/300 |
| 4,744,026 | 5/1988 | Vanderbei | 364/402 |
| 4,744,028 | 5/1988 | Karmarkar | 364/402 |
| 4,797,839 | 1/1989 | Powell | 364/554 |
| 5,014,197 | 5/1991 | Wolf | 364/DIG. 1 |
| 5,053,970 | 10/1991 | Kurihara et al. | 364/468 |
| 5,099,412 | 3/1992 | Kelley | 364/148 |

*Primary Examiner*—David M. Huntley
*Attorney, Agent, or Firm*—William A. Kinnaman, Jr.; Heslin & Rothenberg

[57] ABSTRACT

An optimal set of devices is allocated to a package of device requests. In one embodiment, for each device request within the package of requests, a determination is made as to one or more eligible devices capable of satisfying each of the device requests and for each eligible device, a preference value is obtained. The preference values are then used to assign devices to a package of device requests such that the sum of the preference values of the assigned devices satisfies a specific optimizing function. The assigned devices provide global optimization of device allocation for a package of requests, thereby improving system throughput and performance.

26 Claims, 2 Drawing Sheets

METHOD AND SYSTEM FOR GLOBAL OPTIMIZATION OF DEVICE ALLOCATION

This application is a continuation, of application Ser. No. 07/898,619, filed Jun. 15, 1992 now abandoned.

TECHNICAL FIELD

This invention relates in general to the management of system resources, and more particularly, to a method and system for globally optimizing the allocation of non-sharable devices.

BACKGROUND ART

In a multi-programming environment, the optimal management of resources is critical to the performance of the computer system. In particular, in a system that requires the allocation of devices, such as for example, tape devices, optical devices, unit record devices and printers, it is important to optimize the allocation and usage of the devices such that performance requirements of the system are met.

Previously, attempts have been made to optimize the allocation of devices by, for instance, using devices that do not require operator or accessor (a robotic mechanism used to automate the mounting or loading of volumes on one or more devices) involvement to satisfy a volume mount on a device. In addition, devices have been selected and used which minimize accessor travel to mount the device when accessor involvement is necessary. This helps to increase the number of volume mounts that can be satisfied within a particular time frame, thus increasing system throughput and performance.

Further, attempts to optimize device allocation in systems such as, for instance, International Business Machine's Multiple Virtual Storage (MVS) system, have included a technique in which device requests are satisfied by locally optimizing on each data definition statement representing a device request. That is, if the system receives, for instance, three device requests, then the most preferable device for the first request will be allocated and then the next available preferable device for the second request will be assigned, and so forth. This local optimization scheme can create a situation in which the assignment or allocation solution for the three devices taken as a group is not optimal, thereby degrading system performance. It is possible, for example, that the best overall solution to improve system performance would not include allocating to the first request its preference device, but to allocate instead, for example, its second preference.

Therefore, a need exists for a technique in which it is not necessary to satisfy device requests on a first come, first serve basis. Further, a need exists for globally optimizing the allocation of devices required for a number of device requests generated from, for example, a job step. A further need exists for a method and system for allocating devices such that system throughput for jobs requiring volume mounts and device allocation is increased and system performance is enhanced.

DISCLOSURE OF INVENTION

The shortcomings of the prior art are overcome and additional advantages are provided in accordance with the principles of the present invention through the provision of a method for allocating devices in order to satisfy requests for the devices. The method includes creating a package of device requests, determining for each of the device requests in the package one or more eligible devices capable of satisfying the device request, determining a preference value associated with each eligible device of each device request and assigning to each of the device requests an eligible device selected from one or more of the eligible devices capable of satisfying the device request such that a different eligible device is assigned to each device request and the sum of preference values associated with the selected devices satisfies a specific optimizing function.

In one embodiment, the specific optimizing function includes minimizing the sum of preference values associated with the selected devices. In another embodiment, the specific optimizing function includes maximizing the sum of preference values associated with the selected devices.

In one embodiment, the package of device requests includes one or more requests being specified by one or more data definition statements in a job step. In another embodiment, the package of device requests includes one or more device requests generated within a preselected amount of time or the package includes a preselected number of device requests.

In yet a further embodiment, each of the eligible devices includes one or more features and in determining the preference value for each eligible device, a priority value is assigned to each feature of an eligible device. The priority values for a device are accumulated and the accumulated value represents the preference value for an eligible device. Further, the priority value is dependent upon a specific device feature of an eligible device and the associated device request of the eligible device.

In yet another embodiment of the invention, a method for allocating devices in order to satisfy device requests is provided which includes creating a package of device requests, determining for each of the device requests in the package one or more eligible devices capable of satisfying the device request, determining one or more priority values associated with each eligible device of each device request and assigning to each of the device requests an eligible device selected from one or more of the eligible devices capable of satisfying the device request such that a different eligible device is assigned to each device request and a sequence of sums of priority values associated with the selected devices satisfies a specific optimizing function. The specific optimizing function includes either lexicographically minimizing or lexicographically maximizing a sequence of sums of priority values associated with the selected devices.

In a further aspect of the invention, a system for allocating devices in order to satisfy device requests for the devices is provided. The system includes means for creating a package of device requests, means for determining for each of the device requests in a package one or more eligible devices capable of satisfying the request, means for determining a preference value associated with each eligible device of each device request and means for assigning to each device request an eligible device selected from one or more eligible devices capable of satisfying the device request such that a different eligible device is assigned to each device request and the sum of preference values associated with the selected devices satisfies a specific optimizing function.

In a further embodiment, each of the eligible devices includes one or more features and the means for determining a preference value includes means for assigning a priority value to each of the features of each device and an accumulator for accumulating priority values for the eligible device to determine the preference value.

In accordance with the principles of the present invention, system throughput and performance is enhanced by optimally allocating devices to satisfy device requests. In addition, the number of volume mounts requiring operator or accessor involvement is decreased.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

BEST MODE FOR CARRYING OUT THE INVENTION

In accordance with the principles of the present invention, a technique is provided for optimally allocating devices to satisfy a package of device requests. In one example, the device allocation method and system of the present invention is used in a data processing system 100, as depicted in FIG. 1.

Figure 1:
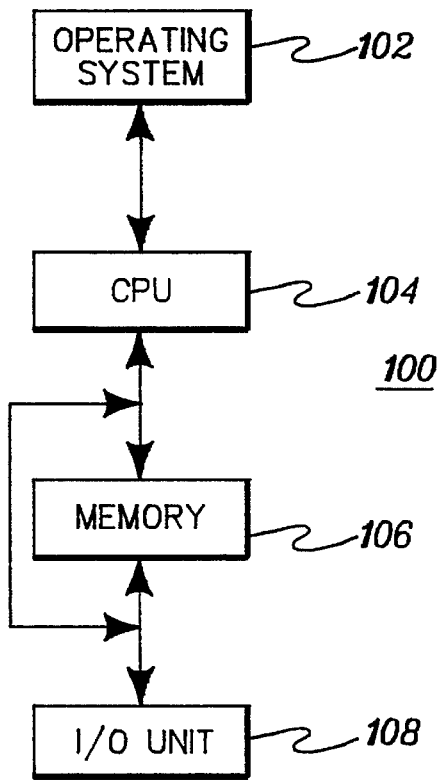
FIG. 1 depicts a block diagram of one embodiment of a data processing system associated with the method and system for optimizing device allocation of the present invention.

Referring to FIG. 1, data processing system 100 includes, for instance, an operating system 102, a central processing unit (CPU) 104, a system memory 106 and an input/output unit 108. Each of the main components of data processing system 100 is described below.

Operating system 102 is coupled to, for example, central processing unit 104 and controls the implementation of programs written by a user and the operation of peripherals associated with program runs and the inputting or outputting of data to or from system memory 106. As one example, operating system 102 includes the allocation technique of the present invention.

Central processing unit 104 is also coupled to, for instance, system memory 106 and input/output unit 108. Central processing unit 104 includes the arithmetic and logic control for system 100. It controls the operation of system 100 by executing a sequence of instructions which are stored in system memory 106.

Input/output unit 108 is coupled to, for example, system memory 106 and is a mechanism by which information is transferred to or from the system memory. Input/output unit 108 includes, for example, input devices such as a computer terminal, and storage devices such as tape devices, optical devices, disk devices and printers.

In a system, such as data processing system 100, requests for storage devices are generated by, for example, a batch or online job which is executing on the system, and each request is satisfied by allocating a storage device to the request. Generally, one or more devices are capable of satisfying a request, however, one device may be more preferable than another device. The manner in which a particular device is selected to satisfy a device request is described further below.

The following is one example of how one or more device requests are generated. A job running within system 100 may include the following job step:

//step1 EXEC PGM= . . .
//DD1 DD UNIT=3490,VOL=SER=A,DSN= . . .
//DD2 DD UNIT=3490,VOLUME=(PRIVATE , , ,),DSN= . . .
//DD3 DD UNIT=3490,VOL=SER=B,DSN= . . .
//DD4 DD UNIT=TAPE,VOL=SER=C,DSN= . . .

Each of the above four data definition statements (i.e., //DD statement) represents a device request. (In this example, each data definition statement represents a single request for a non-sharable device, since there is no number after 3490. In another example, such as //DD5 DD UNIT=(3490,3), VOL=SER=A, DSN . . . , the data definition statement represents three device requests for non-sharable devices. A non-sharable device is a device that may be used serially by multiple jobs.) In accordance with the principles of the present invention, each of the above device requests is satisfied by allocating an eligible device to each request in a manner which optimizes the use and allocation of the eligible storage devices, as explained in detail herein.

Figure 2:
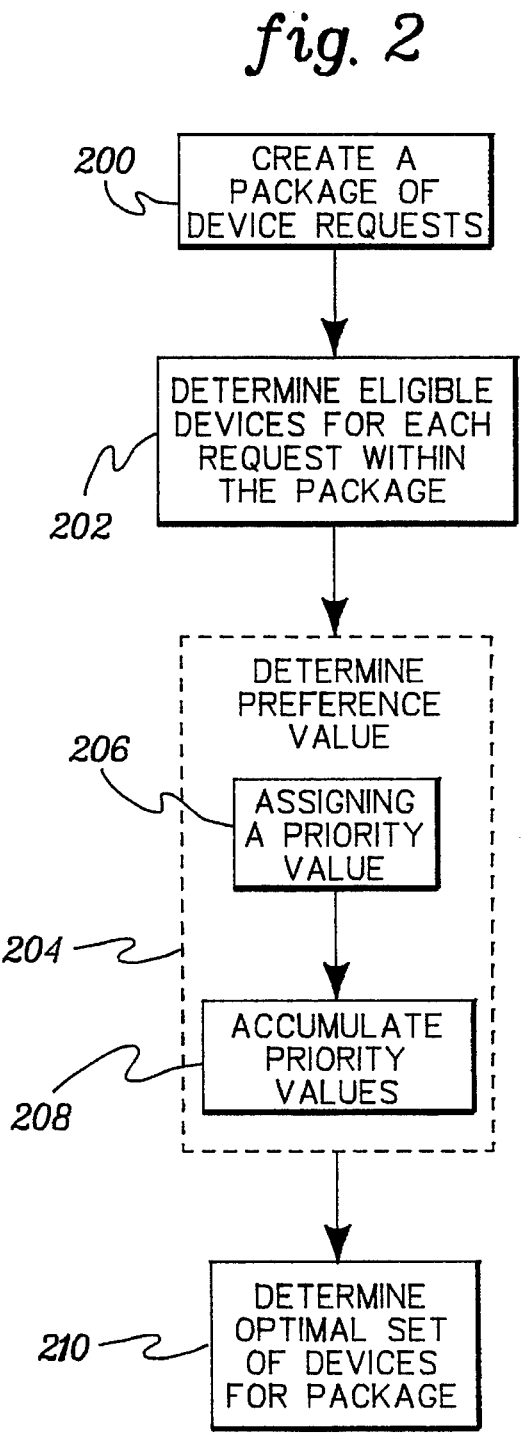
FIG. 2 depicts one example of a logic flow diagram of the global optimization technique of the present invention.

The technique of the present invention for globally optimizing device allocation to satisfy one or more device requests is described in detail with reference to the logic flow diagram depicted in FIG. 2. Referring to FIG. 2, initially, a package of device requests is created, STEP 200 "Create a Package of Device Requests." The package of device requests includes, in one preferred example, all of the device requests generated in a job step, such as the one depicted above. In another example, the package of device requests includes a number of device requests generated, for instance, during a preselected amount of time or which satisfies a minimum threshold of work (i.e., the package includes a preselected number of device requests). As one example, a package may consist of all the device requests occurring during a one minute time frame.

Figure 3:
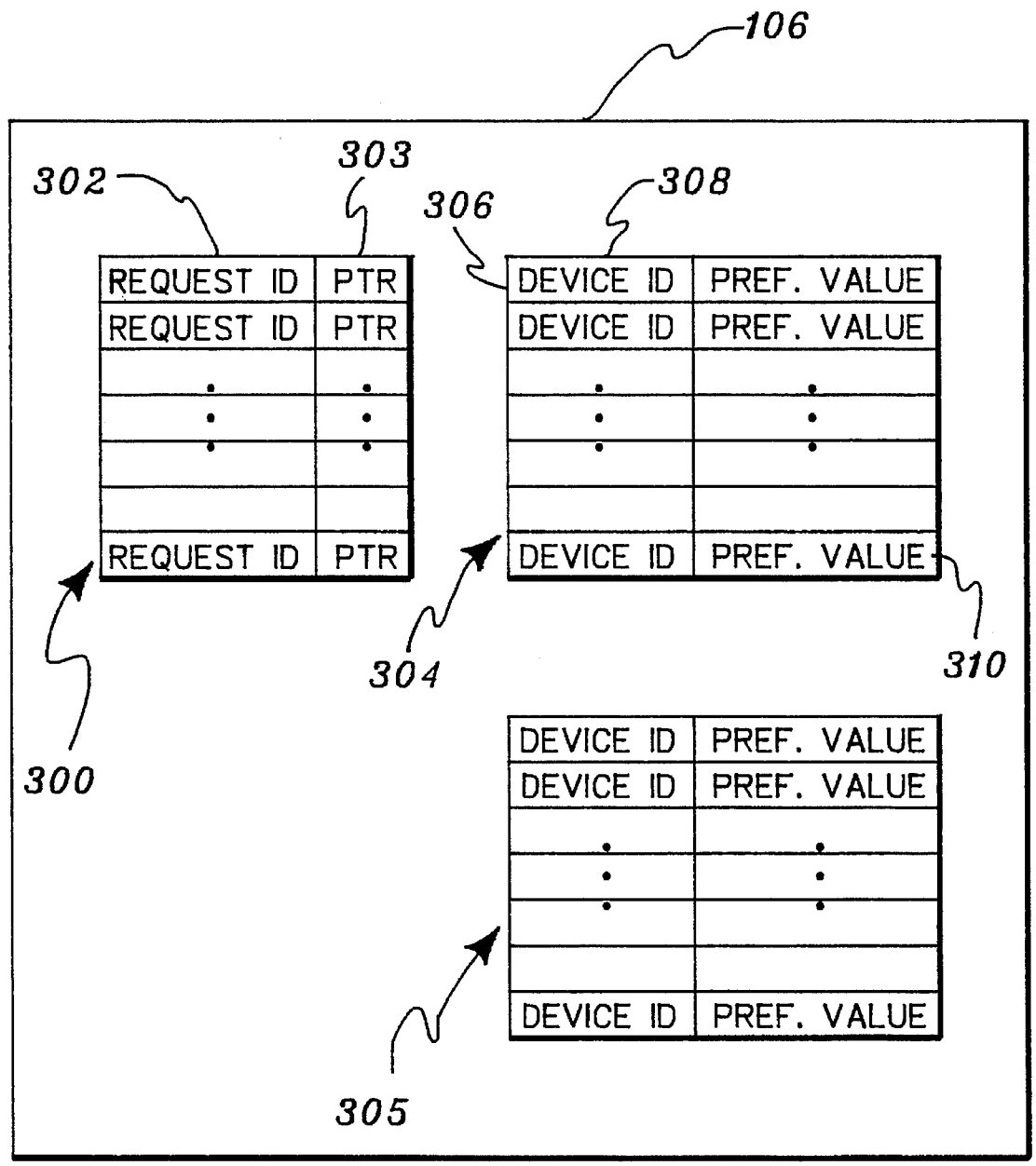
FIG. 3 depicts one example a package of requests and a list of eligible devices for the package, in accordance with the principles of the present invention.

The package of device requests is represented within system memory 106 as, for example, a list 300 (FIG. 3) (as other examples, it can also be represented as, for instance, a queue or an array), which contains each of the device requests. Each entry within list 300 includes a request identifier 302 (such as, for instance, a two byte identification number) and a pointer 303 to a respective device eligible list 304, 305 (e.g., pointer 303 reflects the address in memory of where the corresponding list of eligible devices is located), described in detail below. Using the above job step as an example, list 300 located within system memory 106 would include four device requirements, one for each data definition statement. Each device request in list 300 is represented by a specific request identifier 302 and has a corresponding pointer to an eligible device list. In the preferred embodiment, if a device request requires multiple devices (such as the three devices requested in //DD5 described above), then a separate request is placed on the list for each device requirement. As one example, list 300 would contain three separate requests to satisfy the single data definition statement requesting multiple devices (i.e., //DD5).

In one embodiment, it is the operating system that determines the number of requests specified by a data definition statement and places the appropriate number of requests on list 300 within the system memory. In particular, programming code within the operating system scans each data definition statement to locate the number of devices required and places the appropriate number of requests on the list.

Subsequent to creating the package of device requests, a determination is made as to the one or more storage devices eligible for satisfying each device request contained within list 300, STEP 202 "Determine Eligible Devices for Each Request within the Package (FIG. 2)." Device eligibility may be determined in a number of ways. For instance, the data definition statement (i.e., //DD statement) located within a job step may designate one or more specific devices to be eligible devices or the data definition statement may include a token name, (e.g., 3490, TAPE), which maps to a certain set of devices with specific features to be eligible devices. For instance, token 3490 may be defined at system installation to map to the following four 3490 devices: 5A0, 5A1, 5A2 and 5A3, and therefore, each of these devices is considered an eligible device for each request specifying UNIT=3490 (e.g., //DD1, //DD2 and //DD3 listed in the above example). The list of eligible devices corresponding to a particular request is located by pointer 303 associated with the request. For example, the first entry located within list 300 may include a pointer to device list 304 and the second entry may include a pointer to device list 305 (which is similar in nature to device list 304).

The list of eligible devices (e.g., list 304, list 305) is located within system memory 106 and each entry 306 within the list includes a device identifier 308 (e.g., 5A0, 5A1 etc.) and a preference value 310, which is described in further detail below.

After the list of eligible devices for each request contained within list 300 is determined, the preference value for each eligible device associated with a particular request is determined, STEP 204 "Determine Preference Value." In one example, each preference value is determined by accumulating (as one example, an accumulator located within the central processing unit may be used) priority values which have been predetermined for each device request and eligible device combination. In particular, in the definition of the operating system (e.g., either a table in the operating system or operating system code) a relative priority is defined for each possible combination of characteristics and features associated with a device request and storage device combination, STEP 206 "Assigning a Priority Value." There are numerous characteristics and features which are system dependent, and therefore, the following examples are only illustrative. The invention may be used with any of these numerous device request characteristics and device features without departing from the spirit of the invention, and therefore, they are encompassed within the invention.

As one illustrative example, a device request may have one or more of the following characteristics: a request may require a specific volume (e.g., MYTAPE) or may request any non-specific, empty volume (scratch); and a request may indicate that it requires a specific media type (e.g., 200 megabyte capacity versus 400 megabyte capacity) or it may indicate that any available media type is acceptable.

Also, as one illustrative example, a device may have one or more of the following features:

the device may have a volume cache, which is a set of cartridges that are placed in a loader on a tape device to allow scratch volume mounts to be satisfied without operator/accessor (an accessor is a robotic mechanism used to automate the mounting or loading of volumes) involvement. The cache can be empty (inactive) or non-empty (active) and can be filled with different physical types of volumes (media). Volume caches are much faster than accessor mounts and leaves the accessor free to satisfy other pending volume mounts;

a particular device may be more capable of storing larger quantities of data at faster rates than other devices;

a device may be relatively closer than other devices to the shelf location of the required volume, thereby minimizing the operator/accessor travel distance and the time required to get the cartridge or tape and mount it on the specified device; and devices may reside in different libraries and the libraries may be prioritized based upon, for instance, the scratch volume availabilities.

As previously mentioned, for each possible device request characteristic and device feature, a relative priority is provided and stored within, for example, a table within the operating system or placed within the operating system code. It is possible, for example, that similar device features may have different priorities depending on the device requests. The relative priority assigned to each combination may be different for each system and is dependent on, for example, system performance requirements. As one example, prioritizing is based on the objective of maximizing system throughput and hence, the combinations that would result in the quickest volume mount are given the highest priority. In addition, in order to enhance system throughput, the volume cache, described above, is considered a high priority. The relative priority of each combination is identified by a cost factor.

In one embodiment, the cost factor is represented by 31-bit numbers, each of which is divided into a plurality of ranges of significant digits to represent the relative priority of each combination (the relative priority is a weighted priority). The more important features of, for instance, meeting the objective of maximizing system throughput, are given the higher ranges. For example, the maximum number that can be represented by 31 bits is 2,147,483,647 and the range of 100,000,000 to 900,000,000 is reserved for the various volume cache related priorities (in this one example, volume cache is considered to be of a higher importance than another device feature); the range of 10,000,000 to 90,000,000 is reserved for the proximity of volume to device feature; and the range of 1,000,000 to 9,000,000 is reserved for model preferencing. In this embodiment, if there are more, for instance, devices or models than ranges, then the excess devices or models, etc. are all assigned to their respective lowest priority value. (Once again, this is only one example. It will be apparent to those of ordinary skill in the art that additional preferencing schemes may be used without departing from the spirit of the invention.) Subsequent to defining the ranges for the particular device features, a relative priority may be assigned to the combination of request characteristic and device feature. A similar device feature may have different priorities depending on the device request that the device is servicing.

The following is one example of a preferencing assignment that may be used:

| Request Characteristic | Device Feature | Relative Priority |
|---|---|---|
| Specific request. | (a) Inactive volume cache of the media type of the requested volume; | 900,000,000 |
| | (b) Inactive volume cache not of the media type of the requested volume; | 800,000,000 |
| | (c) Active volume cache of the media type of the requested volume; | 700,000,000 |
| | (d) Active volume | 600,000,000 |

| Request Characteristic | Device Feature | Relative Priority |
|---|---|---|
| | cache not of the media type of the requested volume. | |
| | (e) Closest device; | 90,000,000 |
| | (f) Next closest device. | 80,000,000 |
| | (g) Fastest model device; | 9,000,000 |
| | (h) Next fastest model device. | 8,000,000 |

Using the above example, including the relative priorities, the preference value for each eligible device for a particular request may be determined. That is, the priority values for each request and associated device feature are added to provide a preference value, STEP 208 "Accumulate Priority Values." For instance, if the first request on list 300 (FIG. 3) is a specific request and there are two eligible devices, with the following features: both have inactive volume caches of the required media type, the first device is closest to the required volume than the second device, and the first device is the most preferred model over the second device, then the preference value for the first device (using the relative priorities previously determined, as described above) is equal to 900,000,000+90,000,000+9,000,000=999,000,000 and the preference value for the second device is equal to 900,000,000+80,000,000+8,000,000=988,000,000. The above example illustrates, for instance, that a range of values provides preferencing between the device features based upon the objective of maximizing throughput, while the values within a range provide granularity that allows prioritization of the device feature based on the request characteristic.

Subsequent to determining the eligible devices for each device request within a package and identifying the preference value for each eligible device, a known optimal assignment algorithm is used to determine an optimal set of devices to be allocated to a package of device requests, STEP 210 "Determine Optimal Set of Devices for the Package." This set is optimal for the entire package (e.g., an entire job step), thereby improving system throughput and performance.

Any number of optimal assignment algorithms may be used to determine the optimal assignment of devices to device requests as long as the algorithm minimizes or maximizes a linear objective function subject to network constraints. This would include linear programming methods such as the Simplex Algorithm or Minimum Cost Network Flow algorithms. In one preferred embodiment, the Hungarian Algorithm for Transportation Problems (J. K. Strayer, *Linear Programming and Its Applications*, Spinger-Verlag, New York, N.Y. 1989 (pages 170–178), which is hereby incorporated by reference) specialized to assignment problems (L. R. Ford Jr. and D. R. Fulkerson, *Flows and Networks*, Princeton University Press, Princeton, N.J., 1962 (pages 93–112), which is also incorporated herein by reference) uses the preference values (to define the cost function of the assignment algorithm), in accordance with the principles of the present invention, to determine an optimal set of devices to satisfy a package of device requests. The assignment of devices to device requests is optimal when, for example, the sum of the preference values associated with the eligible devices being assigned to a package of device requests satisfies a specific optimizing function.

In one implementation, the specific optimizing function includes a minimizing function in which an optimal assignment of devices to device requests occurs when the sum of the preference values of the assigned devices is minimized. Minimized refers to an assignment of devices to device requests such that the cost (i.e., total sum of preference values) of such an assignment is as little as possible taking into consideration that one device can satisfy only one request. In one embodiment, when a minimization function is desired, the preference value for each eligible device is normalized and the normalized preference values are input to the assignment algorithm. (In order to normalize a preference value, the value is subtracted from a predetermined maximum value (e.g., 1,000,000,000 for the above example) and the remainder is considered the normalized value.)

The following is one example of an assignment of devices to device requests such that the optimal assignment is one in which the cost of the assignment is minimized. In the following example, (PREF. refers to the preference value of a given device) there are two device requests and two eligible devices (Device 1 and Device 2). The preference value for each device/request combination is normalized, as described above.

| DEVICE REQUEST | PREF. - DEVICE 1 | PREF. - DEVICE 2 |
|---|---|---|
| REQUEST ONE | 11,000,000 | 1,000,000 |
| REQUEST TWO | 10,000,000 | 1,000,000 |

In the above example, the value of the assignment is minimized by assigning Device 2 to the first request and Device 1 to the second request (sum of the preference values of the assigned devices is equal to 1,000,000+10,000,000= 11,000,000). That is, the above assignment of the devices to the respective device requests produces an optimal assignment with a minimized sum of preference values for the assigned devices. The above assignment is the minimum cost for such an assignment even though the cost associated with assigning Device 2 to both requests would be less (1,000,000+1,000,000=2,000,000), since one device can be assigned to only one request.

In another embodiment of the invention, the specific optimizing function includes a maximizing function in which an optimal assignment of devices to device requests occurs when the sum of the preference values of the assigned devices is maximized. That is, a satisfactory solution (i.e., one device satisfying one request) having the greatest cost factor or the largest sum of preference values is considered the optimal assignment of devices to device requests. In this embodiment, the preference value relating to each device request characteristic and eligible device combination is not normalized before being input to the assignment algorithm.

In yet a further embodiment, a preference value is not obtained for each eligible device and device request combination. Instead, the priority values (described above) are used in order to find an optimal assignment of devices to device requests. In one embodiment, the assignment of devices to device requests is optimal when, for instance, a sequence of sums of priority values associated with the selected devices satisfies a specific optimizing function.

In one implementation, the specific optimizing function includes lexicographically minimizing (or maximizing, in a further example) the sequence of sums of priority values associated with the devices being assigned to device requests. In one example, a particular device request is associated with one or more eligible device features and each device request/device feature combination has an associated priority value. These priority values are input to the assignment algorithm in order to produce an optimal assignment solution. In order to lexicographically minimize (or maximize) a function which includes a sequence of sums of priority values, a procedure is followed consisting of the following steps:

(1) the first of the sequence of sums of priority values, which are input to the algorithm, is minimized (or maximized), as described above with reference to the preference values in the above embodiment;

(2) the set of eligible devices for a specific device request is refined to include only those which are in at least one of the multiplicity of optimal solutions provided by the assignment algorithm solution; and (3) the above two steps are repeated for the next in the sequence of sums of priority values until the sequence is exhausted.

The following example in which there are two device requests and two eligible devices demonstrates the above procedure. As mentioned previously, each eligible device has one or more priority values which are dependent on the device request. In the following example, three device features are used: (a) volume cache, (b) device proximity and (c) model type.

| REQUEST | PRIORITY-DEVICE 1 | PRIORITY-DEVICE 2 |
|---|---|---|
| (a) Volume Cache | | |
| ONE | 100,000,000 | 100,000,000 |
| TWO | 200,000,000 | 200,000,000 |
| (b) Device Proximity | | |
| ONE | 20,000,000 | 10,000,000 |
| TWO | 10,000,000 | 20,000,000 |
| (c) Model Type | | |
| ONE | 1,000,000 | 2,000,000 |
| TWO | 2,000,000 | 1,000,000 |

Using the above example, the first step of lexicographically minimizing a sequence of sums of priority values (as described above with preference values, the priority values for a minimization problem are normalized) is to minimize the first of the sequence of sums of priority values. That is, the priority values in (a) Volume Cache above are input to the assignment algorithm and in this instance, two assignments having the same value are output (e.g., request one can be assigned device 1 and request two can be assigned device 2 yielding a sum of priority values of 100,000,000+ 200,000,000=300,000,000 or request one can be assigned device 2 and request two can be assigned device 1 yielding a sum of priority values of 200,000,000+100,000,000=300, 000,000).

As described above, the algorithm outputs a number of possible solutions and only those eligible devices included in one of those solutions continue to be included as eligible devices. For instance, for device request one, device one is considered eligible since it is included in one of the solutions output by the algorithm (in this example, each of the eligible devices for request one and two remain eligible).

Next, steps one and two above are repeated for each of the other device features until, for instance, an optimal solution is determined. In the above example, the priority values in (b) Device Proximity are input to the assignment algorithm and the minimized solution (i.e., optimal solution) is found. Therefore, in this one example, it is not necessary to proceed with repeating the steps for (c) Model Type. However, if desired, the steps may be repeated for (c) Model Type and the optimal solution remains unchanged.

Subsequent to completing the above described steps of lexicographically minimizing a sequence of sums of priority values, the optimal solution for assigning devices to device requests is provided. This optimal solution takes into consideration each of the individual device features associated with a particular device request instead of combining the features to determine one preference value. It will be apparent to those of ordinary skill in the art that the above procedure may also be used to lexicographically maximize a sequence of sums of priority values associated with the devices to be assigned to device requests without departing from the spirit of the invention.

The method and system for global optimization of device allocation of the present invention facilitates system throughput and increases system performance by allocating devices to device requests in a manner that is optimal for an entire package of device requests.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An automated, computer implemented method for allocating devices in order to satisfy requests for said devices, said method comprising the steps of:

creating a package of device requests, said package of device requests being stored in an electronic memory means of said computer;

determining for each of said device requests in said package one or more eligible devices capable of satisfying the device request;

determining a sequence of priority values associated with each eligible device of each device request, wherein priority values within said sequence of priority values are assigned to different positions;

assigning to each of said device requests an eligible device selected from said one or more eligible devices capable of satisfying said device request such that a different eligible device is assigned to each device request;

adding priority values at each common position for each selected device thereby obtaining a sequence of summed priority values, wherein said sequence of summed priority values satisfies a specific optimizing function; and allocating, to each device request, said eligible device, said eligible device being used by said computer after said allocating.

2. The method of claim 1, wherein said specific optimizing function comprises minimizing the sequence of summed priority values associated with the selected devices.

3. The method of claim 1, wherein said specific optimizing function comprises maximizing the sequence of summed priority values associated with the selected devices.

4. The method of claim 1, wherein said creating step comprises the step of creating a package of one or more device requests, each of said one or more device requests being specified by one or more data definition statements contained within a job step.

5. The method of claim 1, wherein said creating step comprises the step of creating a package of one or more device requests generated within a preselected period of time.

6. The method of claim 1, wherein said creating step comprises the step of creating a package of a preselected number of device requests.

7. The method of claim 1, wherein said one or more eligible devices is represented by a data definition statement.

8. The method of claim 7, wherein said data definition statement includes a token name, said token name being mapped to a set of eligible devices.

9. The method of claim 1, wherein each of said one or more eligible devices includes one or more features, and wherein said step of determining said sequence of priority values for each eligible device further comprises the steps of:

assigning a priority value to each feature of an eligible device; and ordering priority values for said eligible device to determine said sequence of priority values.

10. The method of claim 9, wherein said priority value is dependent upon a specific device feature of said eligible device and the associated device request of said eligible device.

11. A system for allocating devices in order to satisfy requests for said devices, comprising:

processor means for creating a package of device requests;

means for determining for each of said device requests in said package one or more eligible devices capable of satisfying the device request;

means for determining a sequence of priority values associated with each eligible device of each device request, wherein priority values within said sequence of priority values are assigned to different positions;

means for assigning to each of said device requests an eligible device selected from said one or more eligible devices capable of satisfying said device request such that a different eligible device is assigned to each device request;

means for adding priority values at each common position for each selected device thereby obtaining a sequence of summed priority values, wherein said sequence of summed priority values satisfies a specific optimizing function; and means for allocating, to each device request, said eligible device, said eligible device being used by said system after said allocating.

12. The system of claim 11, wherein said specific optimizing function comprises means for minimizing the sequence of summed priority values associated with the selected devices.

13. The system of claim 11, wherein said specific optimizing function comprises means for maximizing the sequence of summed priority values associated with the selected devices.

14. The system of claim 11, wherein said means for creating comprises means for creating a package of one or more device requests, each of said one or more device requests being specified by one or more data definition statements contained within a job step.

15. The system of claim 11, wherein said means for creating comprises means for creating a package of one or more device requests generated within a preselected period of time.

16. The system of claim 11, wherein said means for creating comprises means for creating a package of a preselected number of device requests.

17. The system of claim 11, wherein said one or more eligible devices is represented by a data definition statement.

18. The system of claim 17, wherein said data definition statement includes a token name, said token name being mapped to a set of eligible devices.

19. The system of claim 11, wherein each of said one or more eligible devices includes one or more features, and wherein said means for determining said sequence of priority values for each eligible device further comprises:

means for assigning a priority value to each feature of an eligible device; and means for ordering priority values for said eligible device to determine said sequence of priority values.

20. The system of claim 19, wherein said priority value is dependent upon a specific device feature of said eligible device and the associated device request of said eligible device.

21. An automated, computer implemented method for allocating devices in order to satisfy requests for said devices, said method comprising the steps of:

creating a package of device requests, said package of device requests being stored in an electronic memory means;

determining for each of said device requests in said package one or more eligible devices capable of satisfying the device request;

determining an ordered sequence of priority values associated with each eligible device of each device request, wherein priority values within said ordered sequence of priority values are assigned to different positions;

assigning to each of said device requests an eligible device selected from said one or more eligible devices capable of satisfying said device request such that a different eligible device is assigned to each device request;

adding priority values at each common position for each selected device thereby obtaining an ordered sequence of summed priority values, wherein said ordered sequence of summed priority values satisfies a specific lexicographic optimizing function; and allocating, to each device request, said eligible device, said eligible device being used by said computer after said allocating.

22. The method of claim 21, wherein said specific optimizing function comprises minimizing the ordered sequence of summed priority values associated with the selected devices.

23. The method of claim 21, wherein said specific optimizing function comprises maximizing the ordered sequence of summed priority values associated with the selected devices.

24. A system for allocating devices in order to satisfy requests for said devices, said system comprising:

processor means for creating a package of device requests;

means for determining for each of said device requests in said package one or more eligible devices capable of satisfying the device request;

means for determining an ordered sequence of priority values associated with each eligible device of each device request, wherein priority values within said ordered sequence of priority values are assigned to different positions;

means for assigning to each of said device requests an eligible device selected from said one or more eligible devices capable of satisfying said device request such that a different eligible device is assigned to each device request;

means for adding priority values at each common position for each selected device thereby obtaining an ordered sequence of summed priority values, wherein said ordered sequence of summed priority values satisfies a specific lexicographic optimizing function; and means for allocating, to each device request, said eligible device, said eligible device being used by said system after said allocating.

25. The system of claim 24, wherein said specific optimizing function comprises means for minimizing the ordered sequence of summed priority values associated with the selected devices.

26. The system of claim 24, wherein said specific optimizing function comprises means for maximizing the ordered sequence of summed priority values associated with the selected devices.

* * * * *